(12) United States Patent
Isokawa

(10) Patent No.: US 12,249,354 B2
(45) Date of Patent: Mar. 11, 2025

(54) MAGNETIC DISK DEVICE WITH RECORDING CURRENT ARRANGEMENT

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hiroshi Isokawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/630,195

(22) Filed: Apr. 9, 2024

(65) Prior Publication Data

US 2024/0304211 A1 Sep. 12, 2024

Related U.S. Application Data

(62) Division of application No. 18/132,035, filed on Apr. 7, 2023, now Pat. No. 11,984,143, which is a division of application No. 17/168,639, filed on Feb. 5, 2021, now Pat. No. 11,651,782.

(30) Foreign Application Priority Data

May 14, 2020 (JP) ................................ 2020-085002

(51) Int. Cl.
| | | |
|---|---|---|
| G11B 5/012 | (2006.01) | |
| G11B 25/04 | (2006.01) | |
| G11B 5/00 | (2006.01) | |
| G11B 5/23 | (2006.01) | |
| G11B 5/31 | (2006.01) | |
| G11B 5/39 | (2006.01) | |
| G11B 5/48 | (2006.01) | |

(52) U.S. Cl.
CPC ............ *G11B 5/012* (2013.01); *G11B 25/043* (2013.01); *G11B 2005/0018* (2013.01); *G11B 2005/0024* (2013.01); *G11B 5/23* (2013.01); *G11B 5/3116* (2013.01); *G11B 5/3912* (2013.01); *G11B 5/3983* (2013.01); *G11B 5/4813* (2013.01)

(58) Field of Classification Search
None
See application file for complete search history.

(56) References Cited

U.S. PATENT DOCUMENTS

| | | |
|---|---|---|
| 7,242,550 B2 | 7/2007 | Hara et al. |
| 8,059,365 B2 | 11/2011 | Fukuyama et al. |
| 8,630,052 B1 | 1/2014 | Jung et al. |
| 2012/0194945 A1* | 8/2012 | Gao ........................ G11B 5/012 360/77.02 |

* cited by examiner

*Primary Examiner* — Craig A. Renner
(74) *Attorney, Agent, or Firm* — Maier & Maier, PLLC

(57) ABSTRACT

According to one embodiment, a recording-current supplying section configured to supply a recording current used to excite a magnetic pole to thereby make a magnetic flux flow through the magnetic pole, supplies higher recording currents to those of a plurality of magnetic heads, located more outwardly in a direction along a same axis of rotation, as compared to ones of the plurality of magnetic heads, located closer to a middle position of an interval between the magnetic disks arranged at both ends in the direction along the same axis of rotation.

6 Claims, 11 Drawing Sheets

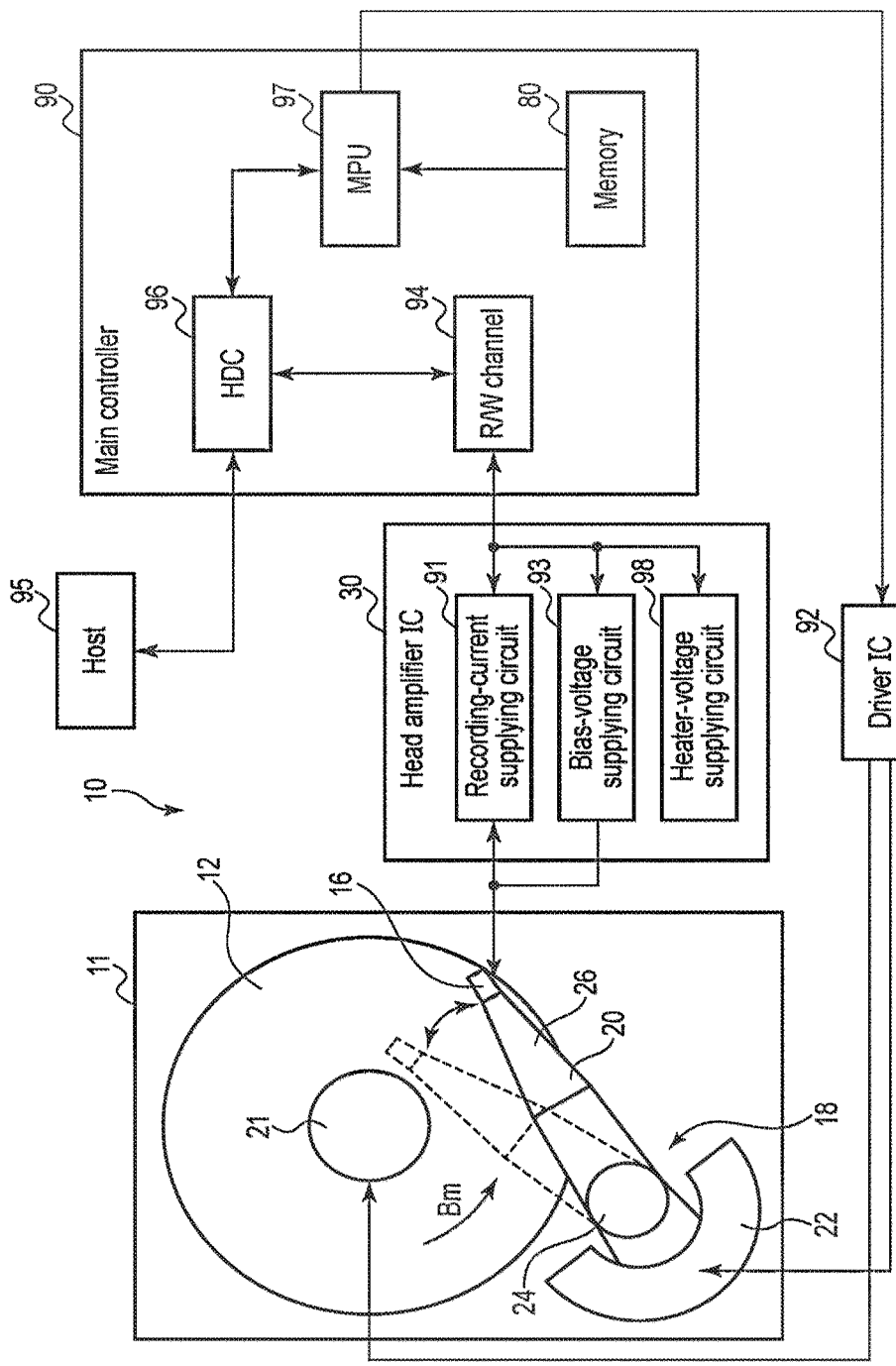
F I G. 1

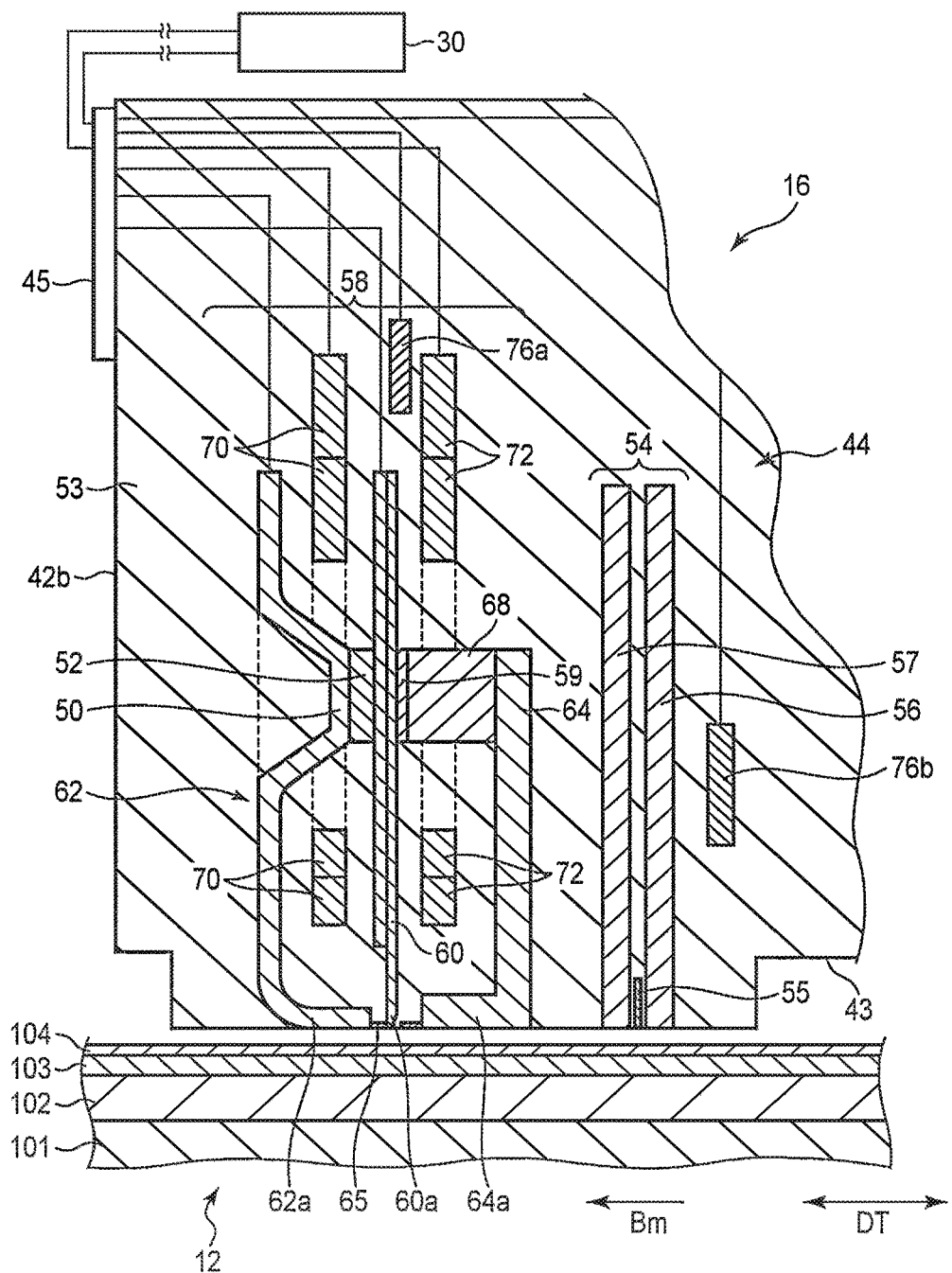
F I G. 3

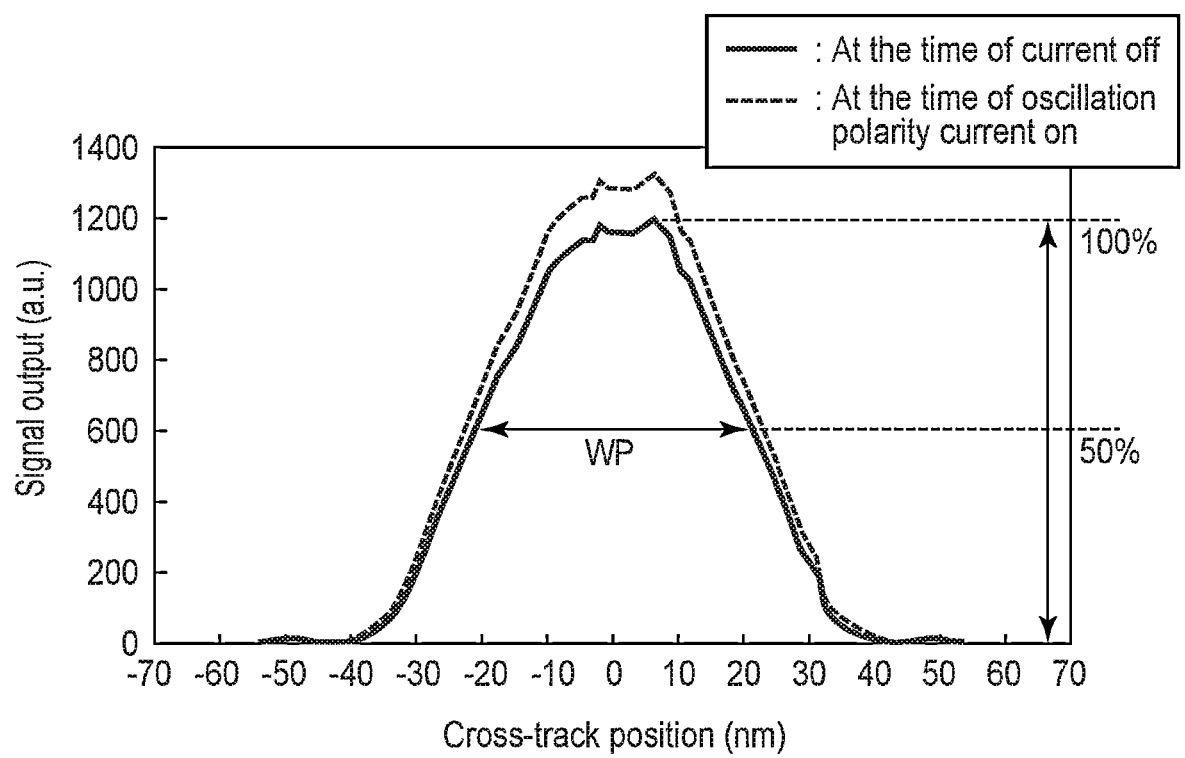
F I G. 8

| Head No. | Write core width (nm) |
|---|---|
| 1(16a) | 54 |
| 2(16b) | 53 |
| 3(16c) | 52 |
| 4(16d) | 51 |
| 5(16e) | 50 |
| 6(16f) | 49 |
| 7(16g) | 48 |
| 8(16h) | 47 |
| 9(16i) | 46 |
| 10(16j) | 46 |
| 11(16k) | 47 |
| 12(16l) | 48 |
| 13(16m) | 49 |
| 14(16n) | 50 |
| 15(16o) | 51 |
| 16(16p) | 52 |
| 17(16q) | 53 |
| 18(16r) | 54 |

FIG. 9

| Group | OW(dB) |
|---|---|
| Gr1(12e) | 20≦OW<23 |
| Gr2(12d,12f) | 23≦OW<26 |
| Gr3(12c,12g) | 26≦OW<29 |
| Gr4(12b,12h) | 29≦OW<32 |
| Gr5(12a,12i) | 32≦OW<35 |

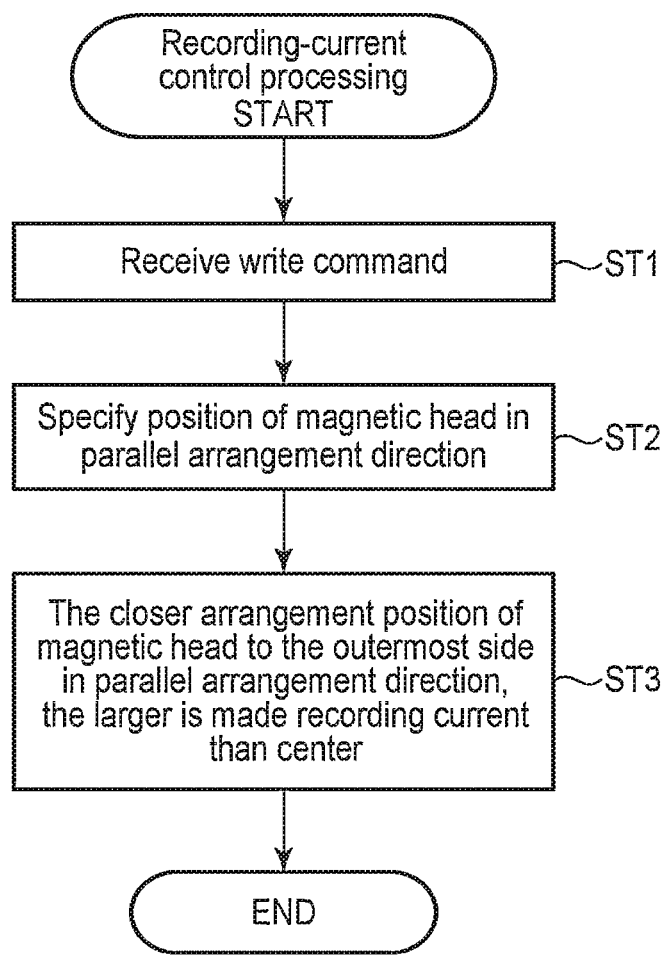
F I G. 12

MAGNETIC DISK DEVICE WITH RECORDING CURRENT ARRANGEMENT

CROSS-REFERENCE TO RELATED APPLICATIONS

This application is a divisional application of application Ser. No. 18/132,035, filed Apr. 7, 2023, which is a divisional application of application Ser. No. 17/168,639, filed Feb. 5, 2021, now U.S. Pat. No. 11,651,782, issued May 16, 2023, which is based upon and claims the benefit of priority from Japanese Patent Application No. 2020-085002, filed May 14, 2020, the entire contents of each of which are incorporated herein by reference.

FIELD

Embodiments described herein relate generally to a magnetic disk device.

BACKGROUND

As a means for increasing the recording capacity of a magnetic disk device, it is effective to increase the number of magnetic disks to be incorporated in the device. However, when the equipping space is limited, in order to increase the number of the magnetic disks, there is a need to reduce the thickness of the magnetic disk and interval between adjacent magnetic disks. Even when the thickness of the magnetic disk and interval between magnetic disks are reduced, it is required that the error occurrence frequency should not be increased at the time of data write or data read due to, for example, deterioration in the positioning accuracy of the magnetic head. The positioning accuracy of the magnetic head is subject to the influence of the torsion or the like occurring to the rotational shaft of the actuator at the time of drive of the magnetic head, and hence the magnetic heads arranged closer to the cover side and the base side are more liable to be deteriorated in the positioning accuracy. That is, the positioning accuracy of the magnetic head differs depending on the position in the direction (parallel arrangement direction) in which the magnetic heads are arranged in parallel with each other.

An embodiment described herein aims to provide a magnetic disk device making it possible to increase the recording capacity thereof by taking the position of a magnetic head in the parallel arrangement direction.

BRIEF DESCRIPTION OF THE DRAWINGS

FIG. 1 is a block diagram schematically showing a hard disk drive (HDD) according to an embodiment.

FIG. 3 is a cross-sectional view showing a head section of the magnetic head in an enlarged form.

FIG. 8 is a view showing a relationship between the cross-track position and signal output to be used when a width of the magnetic characteristics of the main pole is measured.

FIG. 9 is a view showing an example of a value of a magnetic pole width of each of the write heads in the plurality of magnetic heads.

FIG. 12 is a flowchart showing an example of control (recording-current control processing) of a recording current in the HDD.

DETAILED DESCRIPTION

In general, according to one embodiment, a magnetic disk device includes a plurality of magnetic disks and a plurality of magnetic heads. The plurality of magnetic disks includes each a recording layer and arranged on the same axis at intervals in juxtaposition with each other. The plurality of magnetic heads includes each a magnetic pole configured to generate a recording magnetic field in a direction perpendicular to the recording layer and arranged at intervals in the parallel arrangement direction of the magnetic disks in juxtaposition with each other. Among the plurality of magnetic heads, the larger the magnetic pole width of the magnetic pole of the magnetic head in the width direction of a recording track formed in the recording layer or the larger an area width of the magnetic head capable of reading the magnetic characteristics of an area of the recording layer on which magnetic recording has been carried out by means of the magnetic head, the farther is the magnetic head arranged outwardly from the vicinity of the center in the parallel arrangement direction.

First Embodiment

Figure 2:
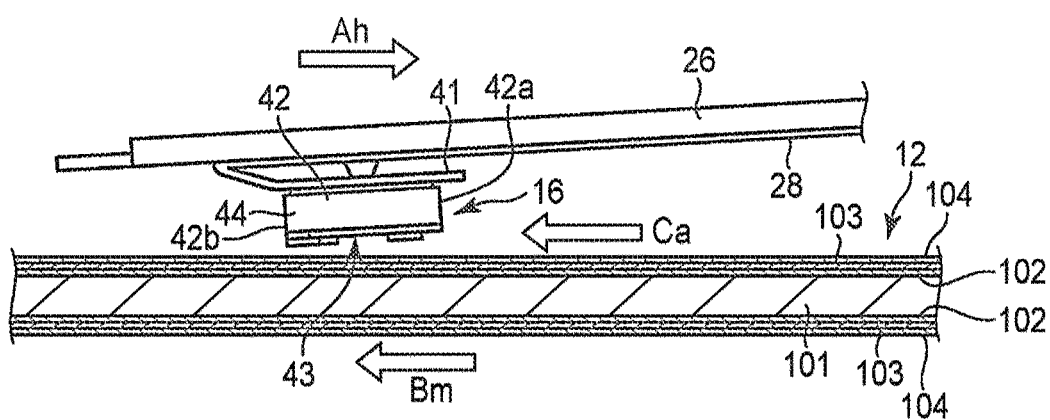
FIG. 2 is a side view schematically showing a magnetic head, suspension, and magnetic disk in the HDD.

A hard disk drive (hereinafter referred to as an HDD) according to a first embodiment will be described in detail as a magnetic disk device. FIG. 1 is a block diagram schematically showing an HDD according to the first embodiment, and FIG. 2 is a side view showing a magnetic head in the floating state and magnetic disk.

As shown in FIG. 1, an HDD 10 is provided with a rectangular housing 11, magnetic disk 12 serving as a recording medium arranged inside the housing 11, spindle motor 21 configured to support thereon and rotate the magnetic disk 12, and a plurality of magnetic heads 16 configured to carry out write/read of data to/from the magnetic disk 12. The housing 11 includes a rectangular box-shaped base (illustration omitted) opened at the upper part thereof, and cover (illustration omitted) to be put on the opening of the base. The base is constituted of, for example, a rectangular bottom wall and sidewall rising along the periphery of the bottom wall, and is integrally formed of aluminum or the like. The cover is screwed onto the sidewall of the base by means of, for example, a plurality of screws, air-tightly closes the opening of the base, and is formed stainless steel or the like.

The HDD 10 is provided with a head actuator 18 configured to move the magnetic head 16 to a position on an arbitrary recording track on the magnetic disk 12 and carry out positioning of the magnetic head 16. The head actuator 18 includes a carriage assembly 20 configured to movably support the magnetic head 16 thereon and voice coil motor (hereinafter referred to as a VCM) 22 configured to rotate the carriage assembly 20.

The HDD 10 is provided with a head amplifier IC 30 configured to drive the magnetic head 16, main controller 90, and driver IC 92. The head amplifier IC 30 is provided on, for example, the carriage assembly 20 and is electrically connected to the magnetic head 16. The head amplifier IC 30 is provided with a recording-current supplying circuit (recording-current supplying section) 91 configured to supply a recording current to recording coils of the magnetic head 16, bias-voltage supplying circuit 93 configured to supply a bias voltage (drive current) to a spin-torque oscillator (hereinafter referred to as an STO) to be described later, heater-voltage supplying circuit 98 configured to supply a drive voltage to heaters to be described later, amplifier (illustration omitted) configured to amplify a signal read by the magnetic head 16, and the like.

The main controller 90 and driver IC 92 are formed 20 on a control circuit board (illustration omitted) provided on, for example, the backside (base side) of the housing 11. The main controller 90 is provided with an R/W channel 94, hard disk controller (hereinafter referred to as an HDC) 96, microprocessor (hereinafter referred to as an MPU) 97, and memory 80. The main controller 90 is electrically connected to the magnetic head 16 through the head amplifier IC 30. The main controller 90 is electrically connected to the VCM 22 and spindle motor 21 through the driver IC 92. The HDC 96 is connectable to the host 95.

As shown in FIG. 1 and FIG. 2, the magnetic disk 12 is configured as a perpendicular magnetic recording medium. The magnetic disk 12 includes a substrate 101 formed into a circular disk-like shape of, for example, a diameter of 88.9 mm (3.5 inches) and constituted of a nonmagnetic material. In each of the surfaces (top surface and undersurface) of the substrate 101, a soft magnetic material layer 102 functioning as a foundation layer and constituted of a material exhibiting soft magnetic characteristics, magnetic recording layer (recording layer) 103 having magnetic anisotropy in the direction perpendicular to the surface of the magnetic disk 12, and protective film 104 are stacked on top of each other from the lower layer to the upper layer in the order mentioned. The magnetic disk 12 is coaxially fitted onto a hub of the spindle motor 21. The magnetic disk 12 is rotated by the spindle motor 21 at a predetermined rotational speed in the direction of the arrow Bm.

The carriage assembly 20 includes a bearing section 24 rotatably supported on the housing 11 and a plurality of suspensions 26 outwardly extending from the bearing section 24. As shown in FIG. 2, the magnetic head 16 is supported on the extension end of each suspension 26. The magnetic head 16 is electrically connected to the head amplifier IC 30 through a wiring member (flexure) 28 provided on the carriage assembly 20.

As shown in FIG. 2, the magnetic head 16 is formed as a floating type head, and includes a slider 42 formed into a shape approximate to a rectangular parallelepiped and head section 44 formed at the end part of the slider 42 on the outflow-end (trailing) side thereof. The slider 42 is formed of a sintered body (AlTiC) constituted of, for example, alumina and titanium-carbide and head section 44 is formed of a multilayer thin film. The slider 42 is attached to a gimbal section 41 of the wiring member 28.

The slider 42 includes a rectangular disk-opposing surface (air bearing surface (hereinafter referred to as an ABS) 43 opposed to the surface of the magnetic disk 12. The slider 42 is maintained in a state where the slider 42 is floated from the surface of the magnetic disk 12 by a predetermined amount by an airflow Ca caused between the disk surface and ABS 43 by the rotation of the magnetic disk 12. The direction of the airflow Ca is coincident with the rotational direction Bm of the magnetic disk 12. The slider 42 includes a leading end 42a positioned on the inflow side of the airflow Ca and trailing end 42b positioned on the outflow side of the airflow Ca. Concomitantly with the rotation of the magnetic disk 12, the magnetic head 16 runs in the arrow Ah direction (head running direction) relatively to the magnetic disk 12, i.e., the magnetic head 16 runs in the direction opposite to the rotational direction Bm of the disk.

FIG. 3 is a cross-sectional view showing a head section 44 of the magnetic head 16 and magnetic disk 12 in an enlarged form. The head section 44 includes a read head (reproducing head) 54 and write head (recording head) 58 both formed by the thin film process at the trailing end 42b of the slider 42 and is formed as a separated type magnetic head. The read head 54 and write head 58 are each covered with a non-magnetic protective insulating film 53 except a part of the slider 42 exposed to the ABS 43. The protective insulating film 53 constitutes the outer shape of the head section 44.

The longitudinal direction of the recording track formed in the magnetic recording layer 103 of the magnetic disk 12 is defined as the down-track direction DT and width direction of the recording track is defined as the cross-track direction CT.

The read head 54 includes a magnetoresistance effect element 55, first magnetic shielding film 56 and second magnetic shielding film 57 both respectively arranged on the leading side (inflow side) of the magnetoresistance effect element 55 and on the trailing side (outflow side) thereof in the down-track direction DT in such a manner as to interpose the magnetoresistance effect element 55 between them. The magnetoresistance effect element 55, and first and second magnetic shielding films 56 and 57 extend approximately perpendicular to the ABS 43. The lower ends of the magnetoresistance effect element 55, and first and second magnetic shielding films 56 and 57 are exposed to the ABS 43.

Figure 4:
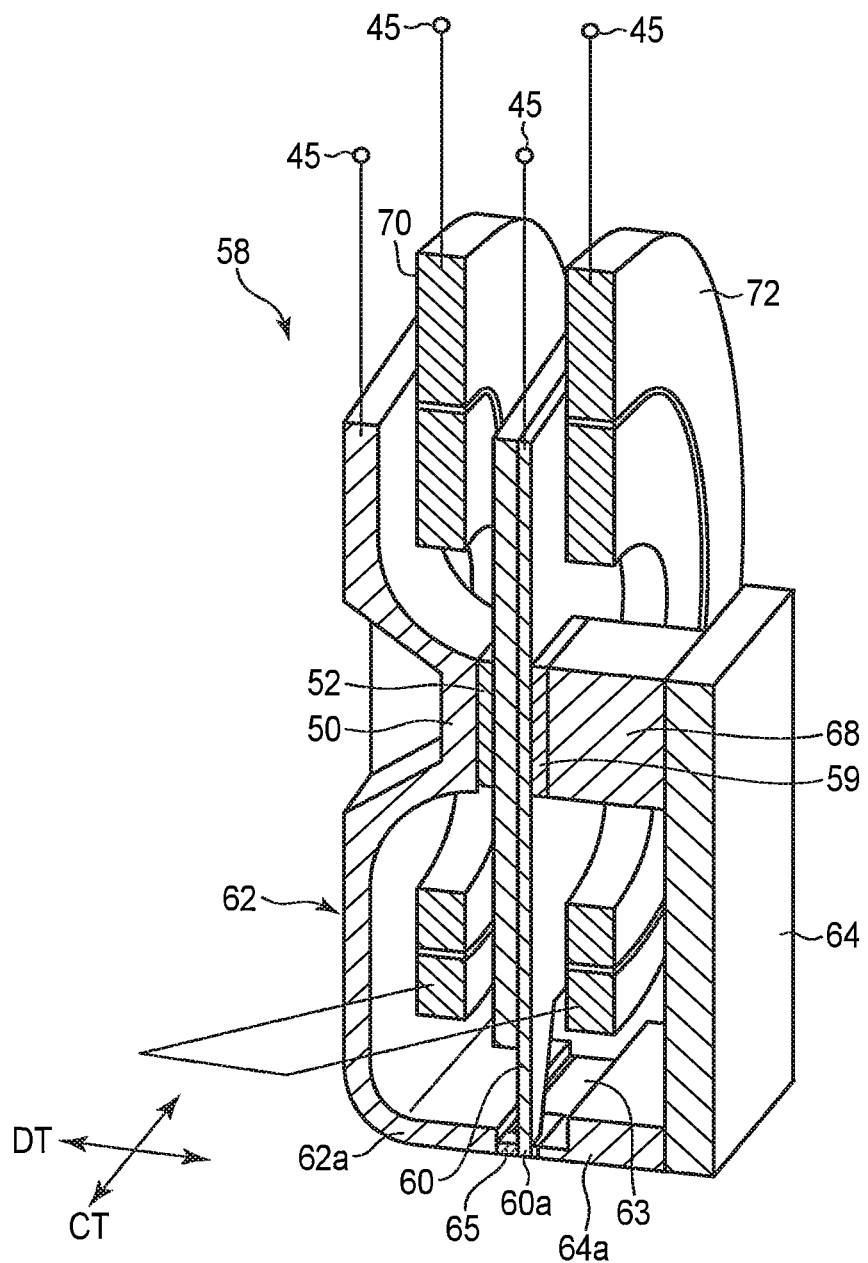
FIG. 4 is a perspective view schematically showing a write head of the magnetic head.
Figure 5:
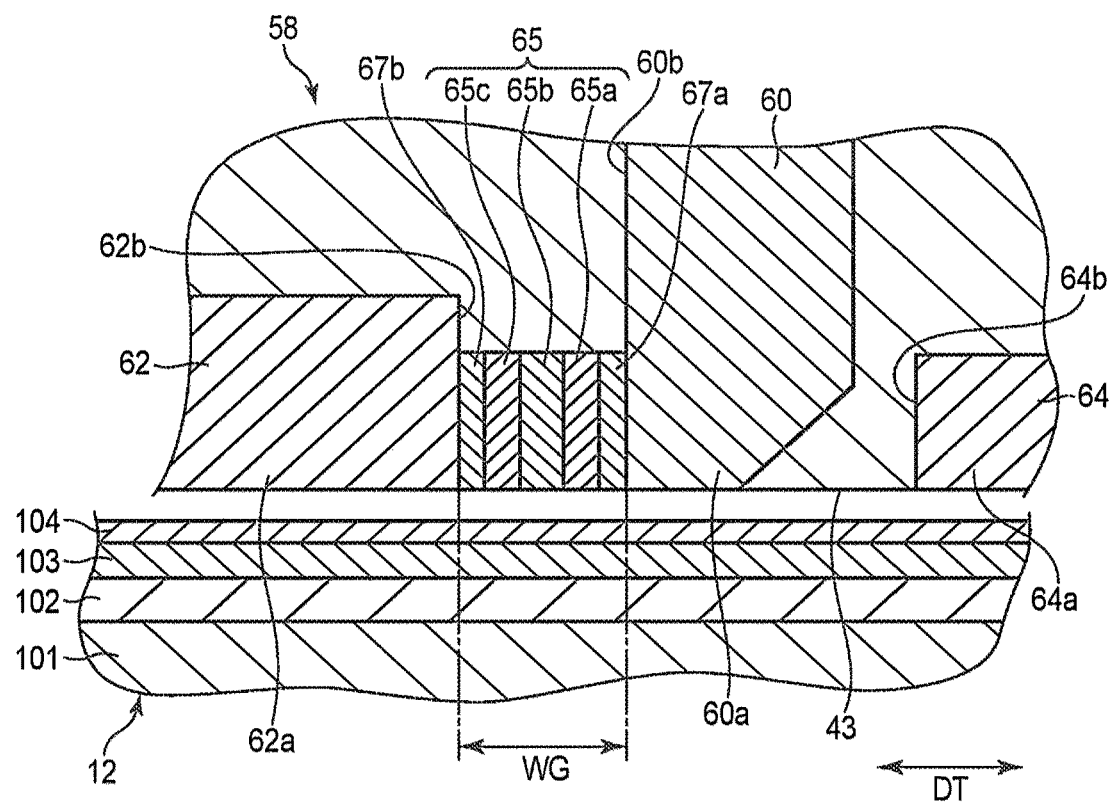
FIG. 5 is a cross-sectional view showing a tip section of the write head in an enlarged form.
Figure 6:
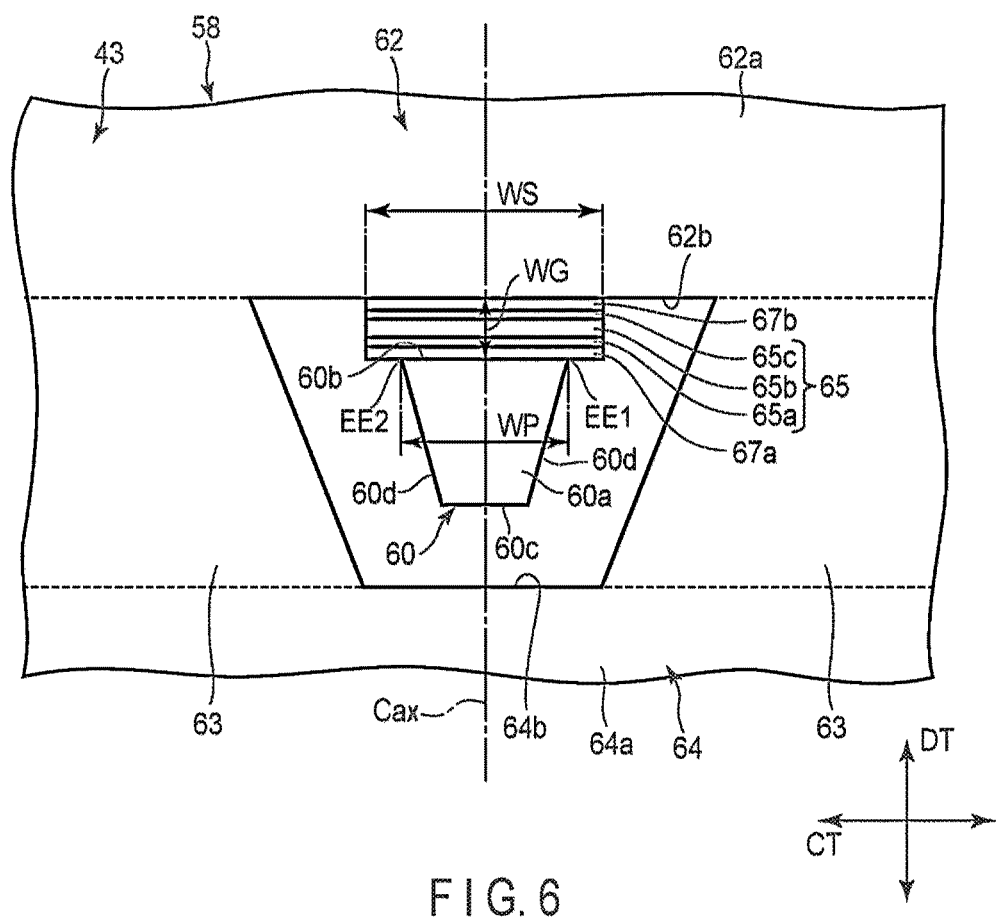
FIG. 6 is a plan view of the write head of the magnetic head viewed from the ABS side.

The write head 58 is provided on the trailing end 44b side of the slider 42 relatively to the read head 54. FIG. 4 is a perspective view of the write head 58 cut along the track center of the write head 58. FIG. 5 is a cross-sectional view showing a tip section (end section on the ABS side) of the write head 58 in an enlarged form. FIG. 6 is a plan view of the write head 58 viewed from the ABS side.

As shown in FIG. 3 and FIG. 4, the write head 58 includes a main pole (magnetic pole) 60 configured to generate a recording magnetic field in the direction perpendicular to the surface of the magnetic disk 12, trailing shield (write shield) 62 provided on the trailing side of the main pole 60 and opposed to the main pole 60 with a write gap WG held between them, leading shield 64 opposed to the leading side of the main pole 60, a pair of side shields 63 provided on both sides of the main pole 60 in the cross-track direction CT, and high-frequency oscillator element provided inside the write gap WG and between the main pole 60 and trailing shield 62, for example, spin-torque oscillator element (STO) 65. The main pole 60 and trailing shield 62 constitute a first magnetic core forming a magnetic path, and the main pole 60 and leading shield 64 constitute a second magnetic core forming a magnetic path. The write head 58 includes a first recording coil 70 wound around the first magnetic core and second recording coil 72 wound around the second magnetic core.

The main pole 60 is formed of a soft magnetic material having high magnetic permeability and high saturation magnetic flux density and extends approximately perpendicular to the ABS 43. The tip section 60a of the main pole 60 on the ABS 43 side is narrowed down in such a manner as to be tapered off toward the ABS 43 and is formed into a columnar shape having a width narrower than the other parts. The tip-end face of the main pole 60 is exposed to the ABS 43 of the slider 42.

As shown in FIG. 5 and FIG. 6, the tip section 60a of the main pole 60 includes a flat trailing-side end face (a shield-side end face) 60b opposed to the trailing shield 62 with a gap held between them. The tip section 60a is formed into, for example, a trapezoidal shape in cross section. The trapezoidal tip section (tip-end face) 60a includes the trailing-side end face 60b extending in the cross-track direction CT, leading-side end face 60c opposed to the trailing-side end face 60b, and both side faces 60d. At the ABS 43, the width of the tip section 60a, i.e., the width WP of the trailing-side end face 60b in the cross-track direction CT is approximately correspondent to track width of the recording track of the magnetic disk 12. At the tip section 60a, the trailing-side end face 60b and leading-side end face 60c may extend in the direction perpendicular to the ABS 43 or may extend in the direction diagonal to the direction perpendicular to the ABS 43. The both side faces 60d extend diagonal relatively to the central axis line Cax, i.e., relatively to the down-track direction DT.

As shown in FIGS. 3 to 6, the trailing shield 62 is formed of a soft magnetic material and is provided in order to efficiently close the magnetic path through the soft magnetic material layer 102 of the magnetic disk 12 immediately under the main pole 60. The trailing shield 62 is arranged on the trailing side of the main pole 60. The trailing shield 62 is formed into an approximately L-shaped member and a tip section 62a thereof is formed into a long and thin rectangular shape. The tip-end face of the trailing shield 62 is exposed to the ABS 43 of the slider 42. The tip section 62a includes a leading-side end face (magnetic-pole end face) 62b opposed to the tip section 60a of the main pole 60. The leading-side end face 62b is sufficiently longer than the width WP of the tip section 60a of the main pole 60 and track width of the magnetic disk 12 and extends in the cross-track direction CT. The leading-side end face 62b extends perpendicular to or slightly diagonal to the ABS 43. At the ABS 43, the lower part of the leading-side end face 62b is opposed to the trailing-side end face 60b of the main pole 60 in parallel with each other with the write gap WG (gap length in the down-track direction DT) held between them.

As shown in FIG. 4 and FIG. 5, the trailing shield 62 includes a first joint section 50 joined to the main pole 60. The first joint section 50 is joined to the upper part of the main pole 60 through a nonconductor 52, i.e., joined magnetically to a part of the main pole 60 separate from the ABS 43. The first recording coil 70 is wound around, for example, the first joint section 50 in the first magnetic core. When a signal is written to the magnetic disk 12, by making a recording current flow through the first recording coil 70, the first recording coil 70 excites the main pole 60 to make a magnetic flux flow through the main pole 60. A recording current to be supplied to the first recording coil 70 and second recording coil 72 is controlled by the main controller 90.

As shown in FIG. 4 and FIG. 6, the pair of side shields 63 is arranged in such a manner as to be physically divided into two sections by the main pole 60 and joined to the trailing shield 62. In this embodiment, the side shields 63 are formed of a high permeability material integral with the tip section 62a of the trailing shield 62 and protrude from the leading-side end face 62b of the tip end section 62a toward the leading end side of the slider 42.

As shown in FIGS. 3 to 5, the leading shield 64 formed of a soft magnetic material is provided on the leading side of the main pole 60 in opposition to the main pole 60. The leading shield 64 is formed into an approximately L-shaped member and a tip section 64a thereof on the ABS 43 side is formed into a long and thin rectangular shape. The tip end face (lower end face) of the tip section 64a is exposed to the ABS 43. The trailing-side end face 64b of the tip section 64a extends in the cross-track direction CT. At the ABS 43, the trailing-side end face 64b is opposed to the-leading side end face 60c of the main pole 60 with a gap held between them. In this embodiment, the tip section 64a of the leading shield 64 is formed of a high permeability material integral with the side shields 63.

Further, the leading shield 64 includes a second joint section 68 joined to the main pole 60 at a position separate from the ABS 43. This second joint section 68 is formed of, for example, a soft magnetic material, and is joined to an upper part of the main pole through a nonconductor 59, i.e., joined magnetically to a part of the main pole 60 separate from the ABS 43. Thereby, the second joint section 68 constitutes a magnetic circuit together with the main pole 60 and leading shield 64. The second recording coil 72 of the write head 58 is arranged in such a manner as to be wound around, for example, the second joint section 68, and applies a magnetic field to this magnetic circuit.

As shown in FIG. 5 and FIG. 6, the STO 65 functioning as a high-frequency oscillator element is provided inside the write gap WG and between the tip section 60a of the main pole 60 and tip section 62a of the trailing shield 62. The STO 65 includes a spin injection layer 65a, intermediate layer (nonmagnetic conductive layer) 65b, and oscillation layer 65c, and is formed by stacking these layers from the main pole 60 side to the trailing shield 62 side in the order mentioned, i.e., by stacking these layers in sequence in the down-track direction DT of the magnetic head 16. The spin injection layer 65a is joined to the trailing-side end face 60b of the main pole 60 through the nonmagnetic conductive layer (foundation layer) 67a. The oscillation layer 65c is joined to the leading side end face 62b of the trailing shield 62 through the nonmagnetic conductive layer (cap layer) 67b. It should be noted that the stacking order of the spin injection layer 65a, intermediate layer 65b, and oscillation layer 65c may also be opposite to the above, i.e., these layers may also be stacked in sequence from the trailing shield 62 side to the main pole 60 side.

Each of the spin injection layer 65a, intermediate layer 65b, and oscillation layer 65c includes a lamination plane or film surface extending in a direction intersecting the ABS 43, for example, direction perpendicular to the ABS 43. The lower end face of at least the oscillation layer 65c, in this embodiment, the lower end face of the whole STO 65 including the spin injection layer 65a, intermediate layer 65b, and oscillation layer 65c is exposed to the ABS 43 and extends flush with the ABS 43. Alternatively, the lower end face of the whole STO 65 may be positioned in the direction of separation from the ABS 43, e.g., in the direction perpendicular to the ABS 43 and backward from the ABS 43, i.e., the lower end face of the whole STO 65 may also be positioned separate from the ABS 43. Further, the lower end face of the STO 65 is not limited to a planar surface and may also be formed into an upwardly convex arc-like shape.

As shown in FIG. 6, at the ABS 43, the width WS of the STO 65 in the cross-track direction CT is formed greater than the width WP of the trailing-side end face 60b of the main pole 60 (WS>WP). In one example, the width WS of the STO 65 is made about 1.1 to 1.6 times the width WP of the main pole 60. Further, the STO 65 is arranged in such a manner as to cover at least one of the end edges (ends in the cross-track direction) EE1 and EE2 of the trailing-side end face 60b, i.e., as to extend to the outside of the main pole 60 beyond the end edge. In this embodiment, the STO 65 is arranged symmetrical relatively to the central axis line Cax, and covers both the end edges EE1 and EE2 of the trailing-side end face 60b in the cross-track direction CT. That is, each of the both end sections of the STO 65 in the cross-track direction CT extends to the outside of the main pole 60 beyond the end edge EE1, EE2 of the trailing-side end face 60b.

As shown in FIG. 4 and FIG. 5, each of the main pole 60 and trailing shield 62 is connected to the connection terminal 45 through the wiring, and is furthermore connected to the head amplifier IC 30 and main controller 90 through the flexure 28. A current circuit through which an STO drive current (bias voltage) is made to flow in series from the head amplifier IC 30 through the main pole 60, STO 65, and trailing shield 62 is formed.

Each of the first recording coil 70 and second recording coil 72 is connected to the connection terminal 45 through the wiring and is furthermore connected to the head amplifier IC 30 through the flexure 28. The second recording coil 72 is wound in the direction opposite to the first recording coil 70. When a signal is written to the magnetic disk 12, by making the recording current flow from the recording-current supplying circuit 91 of the head amplifier IC 30 to the first recording coil 70 and second recording coil 72, the main pole 60 is excited and a magnetic flux is made to flow through the main pole 60. The recording current to be supplied to the first recording coil 70 and second recording coil 72 is controlled by the main controller 90. It should be noted that the second recording coil 72 may also be connected in series to the first recording coil 70. Further, the first recording coil 70 and second recording coil 72 may also be subjected to current supply control separately from each other.

As shown in FIG. 3, the magnetic head 16 may further be provided with a first heater 76a and second heater 76b. The first heater 76a is provided in the vicinity of the write head 58, for example, between the first recording coil 70 and second recording coil 72 and in the vicinity of the main pole 60. The second heater 76b is provided in the vicinity of the read head 54. Each of the first heater 76a and second heater 76b is connected to the terminal 45 through the wiring, and is furthermore connected to the head amplifier IC 30 through the flexure 28.

At the time of an operation of the HDD 10 configured in the manner described above, the main controller 90 drives the spindle motor 21 by the driver IC 92 under the control of the MPU 97, and rotates the magnetic disk 12 at a predetermined rotational speed. Further, the main controller 90 drives the VCM 22 by the driver IC 92, and moves the magnetic head 16 to a position on a desired track of the magnetic disk 12 and carries out positioning of the magnetic head 16. The ABS 43 of the magnetic head 16 is opposed to the disk surface with a gap held between them. In this state, read of recorded information from the magnetic disk is carried out by means of the read head 54, and write of information to the magnetic disk 12 is carried out by means of the write head 58.

At the time of write of information, the bias-voltage supplying circuit 93 of the head amplifier IC 30 makes the drive current flow in series through the connection terminal 45, wiring, main pole 60, STO 65, and trailing shield 62 by applying a bias voltage to the main pole 60 and trailing shield 62 under the control of the MPU 97. The drive current flows in the direction perpendicular to the lamination plane of the STO 65. The STO 65 oscillates spin torque, generates a high-frequency magnetic field, and applies this high-frequency magnetic field to the magnetic recording layer 103 of the magnetic disk 12.

At the same time, the recording-current supplying circuit 91 of the head amplifier IC 30 makes the recording current flow through the first and second recording coils 70 and 72 according to the recording signal and recording pattern generated from the R/W channel 94. The first and second recording coils 70 and 72 excite the main pole 60 to generate the recording magnetic field, and apply the perpendicular oriented recording magnetic field to the magnetic recording layer 103 of the magnetic disk 12 immediately under the main pole 60. Thereby, information is recorded on the magnetic recording layer 103 with a desired track width. By superposing the high-frequency magnetic field of the STO 65 upon the recording magnetic field, the magnetization reversal of the magnetic recording layer 103 is promoted, and magnetic recording of high magnetic anisotropic energy can be carried out.

Further, the spin torque oscillated by the STO 65 is directed to a direction opposite to the direction of the gap magnetic field created between the main pole 60 and trailing shield. Accordingly, the spin torque operates to reduce the leakage flux directly flowing from the main pole 60 to the trailing shield 62. As a result, the amount of the magnetic flux flowing from the main pole 60 toward the magnetic recording layer 103 of the magnetic disk 12 is enhanced, and desired data can be written to the magnetic recording layer 103.

In this embodiment, in the magnetic pole of the magnetic head 16, more specifically, in the main pole 60 of the write head 58 of the head section 44, the magnetic pole width is made different according to the position of the magnetic head 16 (write head 58). The position of the magnetic head in this case is the relative position in the direction in which a plurality of magnetic disks 12 are arranged on the same axis at predetermined intervals, i.e., in the direction (parallel arrangement direction) in which a plurality of magnetic heads 16 are arranged at predetermined intervals in such a manner as to be correspondent to these magnetic disks 12. Hereinafter, the state where the magnetic disks 12 and magnetic heads 16 are arranged in the manner described above is referred to as a stacked state, and the direction in which the magnetic disks 12 and magnetic heads 16 are arranged at predetermined intervals is referred to as a stacking direction. That is, the magnetic disks 12 and magnetic heads 16 are arranged in the stacking direction in the stacked state. The magnetic pole width is the width of the main pole 60 in the cross-track direction CT which is the width direction of the recording track formed in the magnetic recording layer (recording layer) 103 of the magnetic disk 12 and is the width WP of the tip section 60a.

Figure 7:
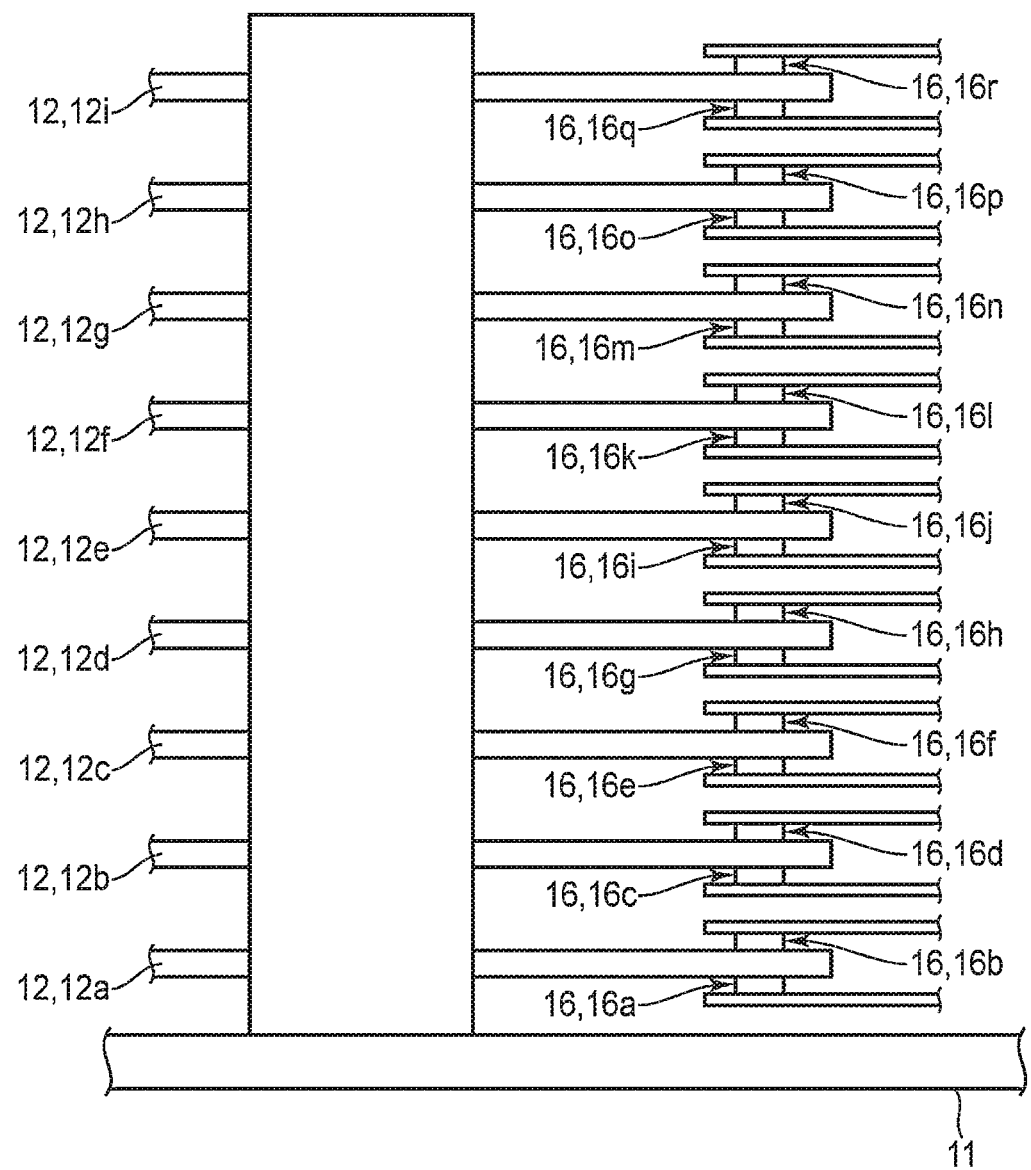
FIG. 7 is a view schematically showing an example of an arrangement configuration of the magnetic disks and magnetic heads.

The number of the magnetic heads 16 corresponds to the number of the magnetic disks 12. In FIG. 7, the configuration in which nine magnetic disks 12 are arranged on the same axis in the stacked state, and eighteen magnetic heads 16 are arranged in the stacked state in such a manner as to be correspondent to both surfaces of the magnetic disks 12 on a one-to-one basis is schematically shown as an example.

These magnetic disks 12 are arranged in sequence from the magnetic disk 12a positioned on the base side (lower side in FIG. 7) of the housing 11 to the magnetic disk 12i positioned on the cover side (upper side in FIG. 7) in the stacked state. Further, in line with the above correspondingly, the magnetic heads 16 are arranged in sequence from the magnetic head 16a positioned on the base side of the housing 11 to the magnetic head 16r positioned on the cover side in the stacked state.

The width WP of the main pole 60 is larger in accordance with the degree of separation of the position of the magnetic head 16 at the outer layer from the vicinity of the center in the stacking direction. That is, the larger the width WP of the magnetic head 16, the farther is the position of the outer layer (outwardly farther from the vicinity of the center in the parallel arrangement direction) at which the magnetic head 16 is positioned from the vicinity of the center in the stacking direction. The center in the stacking direction is the intermediate position in the stacking direction (parallel arrangement direction) specified by the plurality of magnetic heads 16 arranged in the stacked state. To put it another way, the center in the stacking direction corresponds to the position of the center (node) of torsion occurring in the shaft rotatably supported by the bearing section 24 of the carriage assembly 20.

In the example shown in FIG. 7, in the eighteen magnetic heads 16a to 16r, the position between the magnetic heads 16i and 16j corresponds to the center in the stacking direction. Accordingly, these magnetic heads 16i and 16j correspond to the magnetic heads 16 in the vicinity of the center in the stacking direction. Hereinafter, these magnetic heads 16i and 16j are appropriately referred to as central heads and are discriminated from the other magnetic heads 16. It should be noted that when the number of the magnetic heads 16 is an odd number, the magnetic head 16 arranged at the center in the stacking direction corresponds to the central head. Further, the magnetic head 16a is the magnetic head 16 positioned at the outermost layer on the base side in the stacking direction, and magnetic head 16r is the magnetic head 16 positioned at the outermost layer on the cover side in the stacking direction. Hereinafter, these magnetic heads 16a and 16r positioned at the outermost layers are appropriately referred to as outer heads and are discriminated from the other magnetic heads 16.

In the eighteen magnetic heads 16, the width WP of the main pole 60 is larger in the magnetic heads 16 positioned at the outer layers farther from the vicinity of the center in the stacking direction according to the degree of separation from the center. FIG. 9 is a view showing an example of a value of a width WP (write core width) of the main pole 60 of each of the write heads 58 in the eighteen magnetic heads 16a to 16r. In FIG. 9, Head No. 1 corresponds to the magnetic head 16a, and likewise Head No. 18 corresponds to the magnetic head 16 in ascending order.

As shown in FIG. 9, the width WP of the main pole 60 is the smallest in the magnetic heads 16i and 16j which are the central heads, and becomes gradually larger in the magnetic heads 16 positioned on the outer layer side relatively to the central heads in the stacking direction according to the degree of separation from the central heads, and is the largest in the magnetic heads 16a and 16r which are the outer heads. In the example shown in FIG. 9, although the variation (amount of change) in the width WP (write core width) is expressed in units of 1 nm, the variation is not limited to the above. Further, the variations may not necessarily be uniform, and the variation in the width WP may be varied from the central heads to the outer heads.

Here, for example, the larger the width WP of the main pole 60, the more frequently blurred write leaking into the adjacent track occurs easily due to a plurality of times of repetitive write to the magnetic disk 12. For this reason, adjustment such as setting the track width larger or the like becomes necessary. Further, the closer the position of the magnetic head 16 to the base side and cover side of the housing 11, i.e., the closer the position of the magnetic head 16 to the outermost layer side in the stacking direction (on the both sides), the more liable to be worse is the positioning accuracy of the magnetic head 16. In this case, the closer the position of the magnetic disk 12 to the outermost layer side on which the positioning accuracy is relatively the lowest, the more liable is write to protrude into the adjacent track by one time of the write operation, and hence it becomes necessary to set the track pitch larger than those magnetic disks 12 on the inner layer side having relatively higher positioning accuracy.

Conversely, in this embodiment, instead of adjusting the track pitch, the closer the position of the magnetic head 16 to the central head, the smaller the width WP of the main pole 60 is made and, the closer the position of the magnetic head 16 to the outer head, the larger the width of the main pole 60 is made. Accordingly, even when the positioning accuracy of the outer head becomes lower than the central head according to the position of the outer head, it becomes possible to increase the recording capacities of the magnetic disks 12. Magnetic heads 16 different from each other in the width WP of the main pole 60 can be intermingled within one HDD 10, and hence it becomes possible to enhance the yield rate of the magnetic head 16.

As described above, instead of making the width WP of the main pole 60 of the magnetic head 16 positioned closer to the central head smaller according to the position of the magnetic head 16 and making the width WP of the main pole 60 of the magnetic head 16 positioned closer to the outer head larger according to the position of the magnetic head 16, by making, for example, the width of the magnetic characteristics of the main pole 60 of the magnetic head 16 closer to the central head smaller according to the position of the magnetic head 16 and making the width of the magnetic characteristics of the main pole 60 of the magnetic head 16 closer to the outer head larger according to the position of the magnetic head 16, it is also possible to increase the recording capacities of the magnetic disks 12. That is, in this case, the larger the width of the magnetic characteristics of the main pole 60 of the magnetic head 16, the farther the position at the outer layer at which the magnetic head 16 is arranged is from the vicinity of the center in the stacking direction. For example, the width of the magnetic characteristics of the main pole 60 is the smallest in the magnetic heads 16i and 16j which are the central heads, and the closer the position of the magnetic head 16 to the outermost layer side relatively to the central head in the stacking direction, the larger is the width of the magnetic characteristics stepwise, and the width of the magnetic characteristics is the largest in the magnetic heads 16a and 16r which are the outer (outermost) heads. The variations in the width of the magnetic characteristics may not necessarily be uniform, and the variation in the width of the magnetic characteristics may be varied from the central heads to the outer (outermost) heads.

When magnetic recording is carried out with respect to the recording track by using the magnetic head 16, more specifically, by using the write head 58, the width of the magnetic characteristics of the main pole 60 is the width of the recording area in the cross-track direction CT the magnetic characteristics of which can be appropriately read by the read head 54. Regarding such a width, for example, after an off-track profile of the recording signal output at the time when the bias voltage of, for example, the STO 65 is turned off is measured as shown in FIG. 8, the above width is defined as a half value width (50% position) thereof or the like. It should be noted that the value of each of the cross-track position and signal output shown in FIG. 8 is only an example, and is not limited to this.

Next, HDDs according to other embodiments will be described. It should be noted that in each of the other embodiments to be described below, the fundamental configuration is equivalent to the first embodiment. Accordingly, in the following descriptions, the characteristic configuration of each of the other embodiments different from the first embodiment will be described, and configurations identical to the first embodiment are to be referred to the corresponding drawings in the first embodiment, and descriptions of the configurations are omitted.

Second Embodiment

In the second embodiment, the operation performance of each of the magnetic heads 16 is tested before the magnetic heads 16 are incorporated in the HDD 10, and the magnetic heads 16 are classified into a plurality of groups according to the test results. In this embodiment, the error rate of the magnetic head 16 is detected. The error rate is, in one recording (write) operation of write to the recording track of the magnetic disk 12 by using the write head 58, the rate of occurrence of a pattern in which recording (write) protrudes into a recording track (hereinafter referred to as an adjacent recording track) adjacent to the current recording track.

Figures 10, 11:
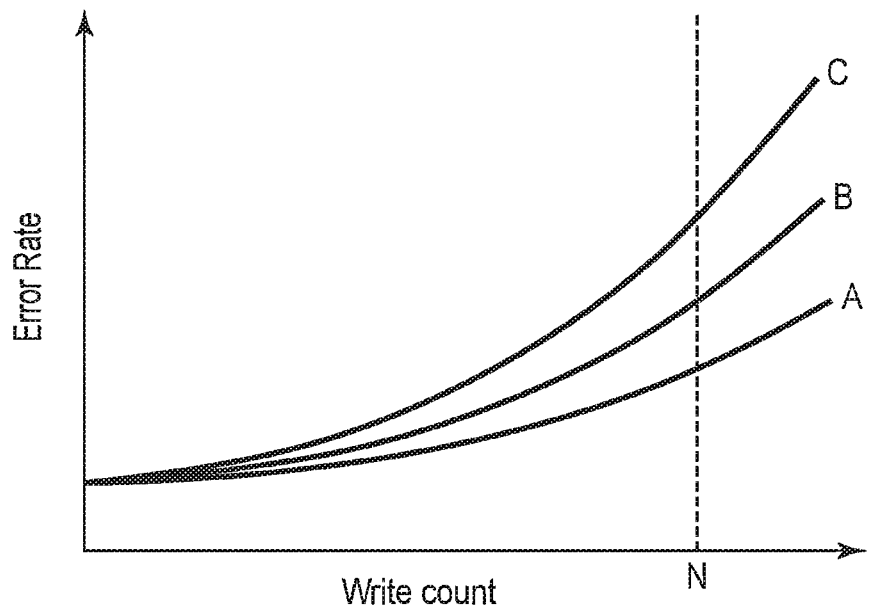
FIG. 10 is a view schematically showing a relationship between a write count indicating the number of times of write to the recording track of the magnetic disk and error rate.
FIG. 11 is a view showing a classification example of the magnetic disks based on the overwrite characteristics (OW).

FIG. 10 is a view schematically showing a relationship between a write count indicating the number of times of write to the adjacent recording track and error rate. In FIG. 10, the magnetic heads 16 are classified into three groups A, B, and C, and a relation between the number of times of write to the adjacent recording track and error rate after the write count in each group is schematically shown. In the examples shown in FIG. 10, the error rate becomes worse in the order of the group A, group B, and group C. More specifically, as the write count increases, i.e., for example, when the write count exceeds N, deterioration in the error rate of the group B becomes conspicuous as compared with the group A, and furthermore, deterioration in the error rate of the group C becomes conspicuous as compared with the group B.

In this embodiment, among a plurality of groups of magnetic heads 16 classified according to the error rate as described above, the higher the error rates of the magnetic heads 16 belonging to the group, the farther is the position of the outer layer (outwardly more separate from the vicinity of the center in the parallel arrangement direction) at which the group is arranged from the vicinity of the center in the stacking direction.

Here, the configuration in which the eighteen magnetic heads 16a to 16r are arranged as shown in FIG. 7 is assumed. In this case, these magnetic heads 16a to 16r are classified into a plurality of groups in units of a predetermined number according to the error rate. As one example, the eighteen magnetic heads 16a to 16r are classified in units of six magnetic heads into three groups A, B, and C corresponding to FIG. 10. More specifically, the magnetic heads 16g, 16h, 16i, 16j, 16k, and 16l belong to the group A. The magnetic heads 16d, 16e, 16f, 16m, 16n, and 16o belong to the group B. The magnetic heads 16a, 16b, 16c, 16p, 16q, and 16r belong to the group C.

Accordingly, in the configuration example shown in FIG. 7, the six magnetic heads 16g to 16l belonging to the group A in which the error rate is the lowest are arranged in the vicinity of the center in the stacking direction. On the base side (positions of the magnetic heads 16d, 16e, and 16f) of above these magnetic heads 16 and on the cover side (positions of the magnetic heads 16m, 16n, and 16o), three each of the magnetic heads 16 belonging to the group B in which the error rate is the second lowest next to the group A are arranged. Furthermore, on the base side (positions of the magnetic heads 16a, 16b, and 16c) and on the cover side (positions of the magnetic heads 16p, 16q, and 16r) three each of the magnetic heads 16 belonging to the group C are arranged.

Thereby, the error rate of the magnetic head 16 becomes higher from the central heads to the outer heads group by group in the stacking direction. It should be noted that the number of groups into which the magnetic heads 16 are classified is not limited to three, and may be two or four or more. Here, in the magnetic heads 16 arranged in the stacking direction, the closer to the outer heads, the more liable to be worse is the positioning accuracy, and it is desirable that the pitch (track pitch) be made larger. On the other hand, whereas it is necessary to widen the track pitch in the outer heads, it becomes possible to more easily alleviate the fringe characteristics (deterioration in the error rate at the time when magnetic recording is carried out on the adjacent track) in the outer heads correspondingly. Further, in the magnetic heads in which the error rate is higher as described above, it is also possible to reduce the track pitch density by increasing the track recording density. Accordingly, in this embodiment, instead of adjusting the track pitch, the higher the error rates of the magnetic heads 16 belonging to the group, the farther is the position of the outer layer at which the group is arranged from the vicinity of the center in the stacking direction. Accordingly, it becomes possible to increase the recording capacities of the magnetic disks 12.

Third Embodiment

In the third embodiment, the operation performance of the magnetic disks 12 is tested before the magnetic disks 12 are incorporated in the HDD 10, and the magnetic disks 12 are classified into a plurality of groups according to the test results. In this embodiment, an index value indicating the overwrite characteristics (OW) of the magnetic disks 12 is detected. The overwrite characteristics are expressed as an index by a difference between the amplitudes of recording patterns before and after the overwrite at the time when a recording pattern of a certain frequency is overwritten with a recording pattern of a frequency different from the frequency of this recording pattern, and the superiority or inferiority (difficulty in writing) of the overwrite characteristics is determined according to the value of the index. For example, in the case of perpendicular magnetic recording, it is more difficult to write a low-frequency signal than to write a high-frequency signal, and hence it is recommendable to make the value in decibel (dB) by which an unerased remaining signal at the time when a low-frequency signal is written after a high-frequency signal is written is expressed the index of the overwrite characteristics.

FIG. 11 is a view showing an example of a case where the magnetic disks 12 are classified on the basis of such overwrite characteristics (OW). In the example shown in FIG. 11, the magnetic disks 12 are classified into five groups according to the range of the value of the overwrite characteristics, i.e., the degree of difficulty in writing. In this case, Gr1 is a group to which the magnetic disks 12 most difficult to be overwritten belong and, in ascending order, Gr5 is a group to which the magnetic disks 12 easiest to be overwritten belong. It should be noted that the thresholds of the groups shown in FIG. 11 are only examples and are not limited to the values shown in FIG. 11, and the thresholds can arbitrarily be set.

In this embodiment, among the plurality of groups into which the magnetic disks 12 are classified according to the overwrite characteristics (OW) as described above, the higher the overwrite characteristics of the magnetic disks 12 belonging to the group, the farther is the position of the outer layer (outwardly farther from the vicinity of the center in the parallel arrangement direction) at which the group is arranged from the vicinity of the center in the stacking direction.

Here, the configuration in which nine magnetic disks 12a to 12i are arranged as shown in FIG. 7 is assumed. In this case, these magnetic disks 12a to 12i are classified into a plurality of groups in units of a predetermined number according to the overwrite characteristics. As one example, the nine magnetic disks 12a to 12i are classified into five groups (Gr1 to Gr5) corresponding to FIG. 11. More specifically, the magnetic disk 12e belongs to Gr1 ($20 \leq OW < 23$). Likewise, the magnetic disks 12d and 12f belong to Gr2 ($23 \leq OW < 26$), magnetic disks 12c and 12g to Gr3 ($26 \leq OW < 29$), magnetic disks 12b and 12h to Gr4 ($29 \leq OW < 32$), and magnetic disks 12a and 12i to Gr5 ($32 \leq OW < 35$), respectively.

Accordingly, in the configuration example shown in FIG. 7, the magnetic disk 12e belonging to Gr1 in which the overwrite characteristics are the lowest is arranged in the vicinity of the center in the stacking direction. On the base side and cover side of the magnetic disk 12e, the magnetic disks 12 belonging to Gr2, Gr3, and Gr4 higher than Gr1 in the overwrite characteristics are respectively arranged. Further, the magnetic disks 12a and 12i belonging to Gr5 which is the highest in the overwrite characteristics are respectively arranged at the outermost layers in the stacking direction.

Thereby, the overwrite characteristics of the magnetic disks 12 become higher group by group from the vicinity of the center in the stacking direction to each of the outermost layers. Accordingly, for example, unlike the first embodiment and second embodiment described above, even when the widths WP of the main poles 60 of the magnetic heads 16 are approximately uniform or even when the error rates are approximately uniform, it becomes possible to increase the recording capacities of the magnetic disks 12.

Fourth Embodiment

In the fourth embodiment, the head amplifier IC 30 makes the recording current for exciting the main pole 60 differ according to the position of the magnetic head 16 (write head 58) in the stacking direction. More specifically, at the time of carrying out magnetic recording on the magnetic disk 12 (write of data to the magnetic disk 12), the recording current to be supplied from the recording-current supplying circuit (recording-current supplying section) 91 to the first recording coil 70 and second recording coil 72 is controlled by the main controller 90.

FIG. 12 is a flowchart showing an example of such control (recording-current control processing) of the recording current to be carried out by the main controller 90.

As shown in FIG. 12, at the time of write of data to the magnetic disk 12, the main controller 90 receives a write command to write data to the magnetic disk 12 from the host 95 (ST1).

Upon receipt of the write command, the main controller 90 selects a data write destination and specifies a recording track of the magnetic disk 12 to which the data is to be written on the basis of servo information or the like. Thereby, the main controller 90 specifies a position of a magnetic head 16 by which the data is to be written (magnetically recorded) to the specified recording track in the stacking direction (parallel arrangement direction) (ST2).

Subsequently, the main controller 90 writes data on the magnetic disk 12 specified as the data write destination. More specifically, the HDC 96 causes the head amplifier IC 30 to execute signal processing of the data through the R/W channel 94. At this time, the head amplifier IC 30 varies the magnitude of the recording current to be supplied from the recording-current supplying circuit 91 to the first recording coil 70 and second recording coil 72 according to the position of the magnetic head 16 (write head 58) in the stacking direction. Thereby, the main pole 60 is excited and the amount of the magnetic flux flowing through the main pole 60 is varied. In the memory 80 of the main controller 90, for example, a predetermined table in which the position of the magnetic head 16 (write head 58) in the stacking direction and optimum value of the recording current at the corresponding position are correlated with each other as a relationship between the above data items is stored. At the time of control of the recording current, the MPU 97 sets the optimum value of the recording current at the position of the magnetic head 16 (write head 58) in the stacking direction according to the table and delivers the value to the head amplifier IC 30 as a parameter.

In this embodiment, the recording current supplying circuit 91 controls the recording current in such a manner that the closer the arrangement position of the magnetic head 16 (outer head) to the outermost layer side (outermost side in the parallel arrangement direction) in the stacking direction, the larger is made the recording current for exciting the main pole 60 (of the outer head) than the magnetic head 16 (central head) arranged in the vicinity of the center in the stacking direction (parallel arrangement direction) (ST3). Making the recording current for exciting the main pole 60 larger exhibits an effect equivalent to increasing the width WP of the main pole 60. Accordingly, by making the recording current for exciting the main pole 60 of the outer head larger than that of the central head according to the degree of separation of the outer head from the central head, it becomes possible to obtain the effect equivalent to making the width WP of the main pole 60 of the outer head larger than the central head according to the degree of separation of the outer head from the central head.

Thereby, for example, unlike the first embodiment and second embodiment described above, even when the widths WP of the main poles 60 of the magnetic heads 16 are approximately uniform or even when the error rates are approximately uniform, it becomes possible to increase the recording capacities of the magnetic disks 12. Further, for example, unlike the third embodiment described above, even when the overwrite characteristics (OW) of the magnetic disks 12 are approximately uniform, it becomes possible to increase the recording capacities of the magnetic disks 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a plurality of magnetic disks each including a recording layer, arranged at intervals from each other and rotating around a same axis of rotation;
a plurality of magnetic heads each including a magnetic pole configured to generate a recording magnetic field in a direction perpendicular to the recording layer, and arranged at intervals corresponding to the recording layers; and
a recording-current supplying section configured to supply a recording current used to excite the magnetic pole to thereby make a magnetic flux flow through the magnetic pole, wherein
the recording-current supplying section supplies higher recording currents to those of the plurality of magnetic heads located more outwardly in a direction along the same axis of rotation, as compared to ones of the plurality of magnetic heads located closer to a middle position of an interval between the magnetic disks arranged at both ends in the direction along the same axis of rotation.

2. The magnetic disk device of claim 1, wherein
the recording-current supplying section supplies the recording currents to the magnetic heads respectively according to values of the recording currents set in a table in which arrangement positions of the magnetic heads in the direction along the same axis of rotation and the values of the recording currents at the arrangement positions are correlated with each other, respectively.

3. The magnetic disk device of claim 1, wherein
in the plurality of magnetic heads, widths of magnetic poles in a radial direction of recording tracks formed in the recording layer are uniform.

4. The magnetic disk device of claim 1, wherein
in the plurality of magnetic heads, rates of occurrence of protrusion of magnetic recording into an adjacent recording track adjacent to a recording track at a time of magnetic recording on the recording track formed in the recording layer are uniform.

5. The magnetic disk device of claim 1, wherein
in the plurality of magnetic disks, index values indicating overwrite characteristics of the plurality of magnetic disks are uniform.

6. The magnetic disk device of claim 5, wherein
the index values are each a value in decibel (dB) by which an unerased remaining signal at a time when a low-frequency signal is written after a high-frequency signal is written is expressed.

* * * * *